US012604259B2

(12) United States Patent
Jia

(10) Patent No.: US 12,604,259 B2
(45) Date of Patent: Apr. 14, 2026

(54) NON-STANDALONE PRIMARY SECONDARY CELL SELECTION BASED ON HIGHER PRIORITY BAND

(71) Applicant: AT&T Intellectual Property I, L.P., Atlanta, GA (US)

(72) Inventor: Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 602 days.

(21) Appl. No.: 17/664,686

(22) Filed: May 24, 2022

(65) Prior Publication Data

US 2023/0388912 A1 Nov. 30, 2023

(51) Int. Cl.
| | |
|---|---|
| *H04W 48/18* | (2009.01) |
| *H04W 24/10* | (2009.01) |
| *H04W 48/20* | (2009.01) |
| *H04W 52/02* | (2009.01) |
| *H04W 72/56* | (2023.01) |

(52) U.S. Cl.
CPC ........... *H04W 48/18* (2013.01); *H04W 24/10* (2013.01); *H04W 48/20* (2013.01); *H04W 52/0261* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 10,015,717 | B1 * | 7/2018 | Oroskar | ................ H04W 36/04 |
| 2013/0040692 | A1 * | 2/2013 | Chen | ................. H04W 36/0085 |
| | | | | 455/517 |
| 2015/0181530 | A1 * | 6/2015 | Lee | ................... H04W 52/0261 |
| | | | | 455/434 |
| 2015/0334765 | A1 * | 11/2015 | Rahman | ................ H04L 5/0092 |
| | | | | 370/328 |
| 2017/0048740 | A1 * | 2/2017 | Yang | ........................ H04L 1/003 |
| 2017/0150384 | A1 * | 5/2017 | Rune | ................... H04W 72/542 |
| 2019/0182898 | A1 * | 6/2019 | Yu | ....................... H04B 7/06958 |

(Continued)

FOREIGN PATENT DOCUMENTS

| | | | |
|---|---|---|---|
| GR | 20210100 | * | 9/2021 |

*Primary Examiner* — Andre Tacdiran
(74) *Attorney, Agent, or Firm* — Guntin & Gust, PLC; Erik Boyd

(57) ABSTRACT

The disclosed technology is directed towards prioritizing selection of a new radio primary secondary cell (PSCell) for use by user equipment in non-standalone scenarios. User equipment (a mobile device) obtains measurement reports for available new radio frequency bands. The mobile device can prioritize the reporting of the measurement data so as to indicate to the network which candidate PSCell that the user equipment prefers to have selected. The network can bias selection of one candidate PSCell over others by providing different time-to-trigger periods for different available frequency bands. A mobile device can prioritize PSCell selection based on current conditions, such as based on application program needs, so as to use a PSCell with bandwidth that is appropriate for a current application program in use. The mobile device and network can collaborate to select a PSCell based on other conditions such as remaining battery capacity of the device and/or thermal conditions.

20 Claims, 10 Drawing Sheets

(56)         References Cited

U.S. PATENT DOCUMENTS

| 2019/0268059 | A1* | 8/2019 | Yang ..................... H04L 1/1812 |
| 2020/0154324 | A1* | 5/2020 | Ozturk .................. H04W 16/14 |
| 2022/0070915 | A1* | 3/2022 | Awoniyi-Oteri ........................... H04W 52/0206 |
| 2022/0150904 | A1* | 5/2022 | Santhanam ....... H04W 36/0085 |
| 2022/0361065 | A1* | 11/2022 | Kumar ............. H04W 36/0079 |
| 2023/0156556 | A1* | 5/2023 | Choi ..................... H04W 36/32 370/331 |
| 2023/0269649 | A1* | 8/2023 | Iskander .......... H04W 36/0094 455/436 |
| 2024/0064598 | A1* | 2/2024 | Bergström .............. G08G 5/26 |
| 2024/0322966 | A1* | 9/2024 | Elshafie ............... H04W 72/23 |

* cited by examiner

100

102(1)

Non-Prioritized
Measurement
Report(s) — 104(1)

102(2)

104(2) — Prioritized
Measurement
Report(s)

*Possibly Not Selected*                                    108
High
Priority NR

*Selected*                                    108
High
Priority NR

110
Low Priority
NR

110
Low Priority
NR

106(1)

106(2)

*Possibly Selected*                112

*Not Selected*                112

LTE

LTE

Without
Priority
Reporting — 116

118 — With Priority
Reporting

114  Network - Selection Based on Measurement Reports

220

Network Configures B*x* Measurement

Compare with B*x* RSRP Threshold

UE Reports B*x* Measurement for Network to Add PSCell

UE Scan and Measure

Time to Trigger
a) Time = same, criteria-based order
b) Time = biased for order
c) Time = same, app-based order
c) Time = same, energy-based order Add NR Band to NSA as PSCell

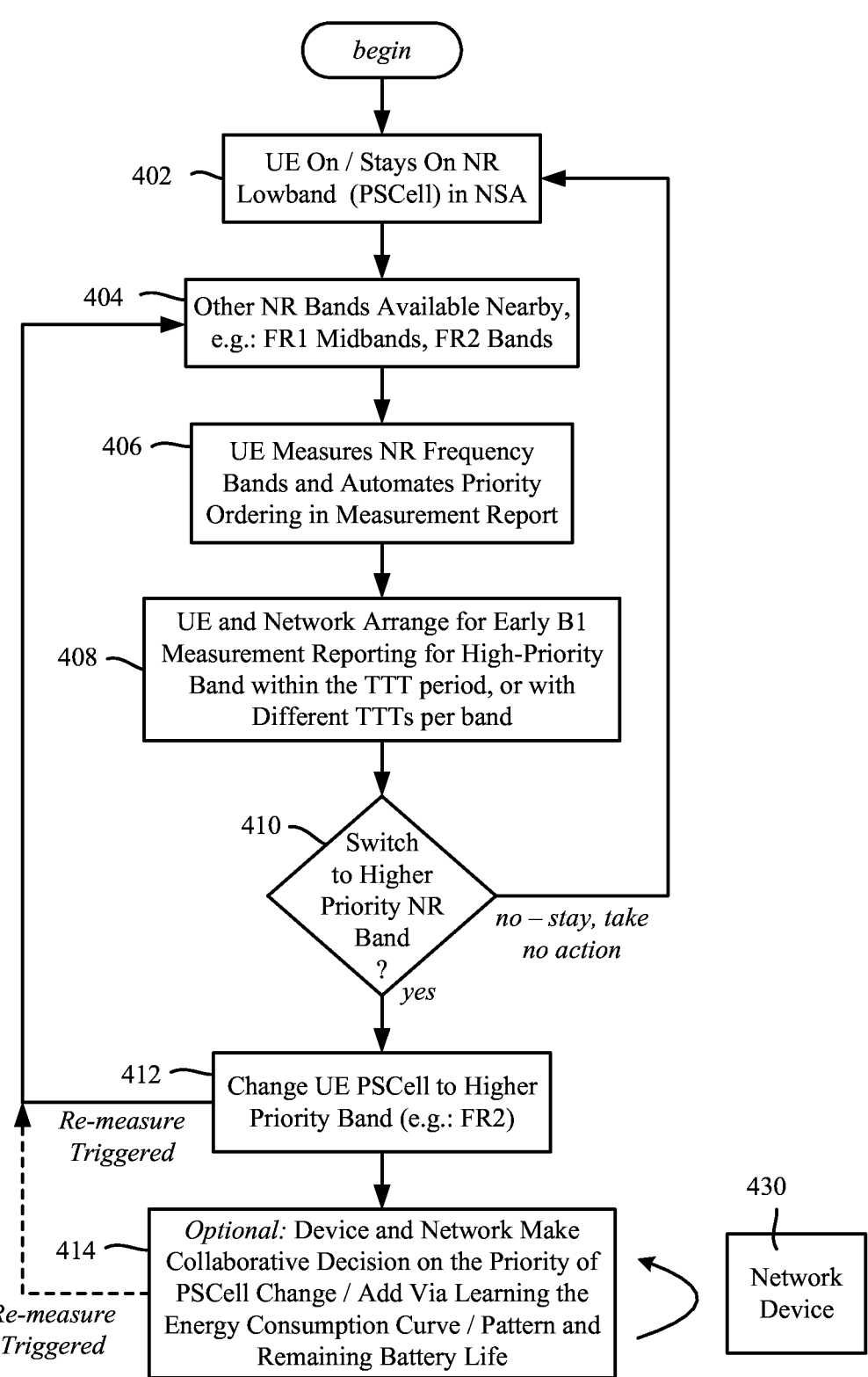

begin

402 — UE On / Stays On NR Lowband (PSCell) in NSA

404 — Other NR Bands Available Nearby, e.g.: FR1 Midbands, FR2 Bands

406 — UE Measures NR Frequency Bands and Automates Priority Ordering in Measurement Report 408 — UE and Network Arrange for Early B1 Measurement Reporting for High-Priority Band within the TTT period, or with Different TTTs per band 410 — Switch to Higher Priority NR Band ?

*no – stay, take no action*

*yes*

412 — Change UE PSCell to Higher Priority Band (e.g.: FR2)

*Re-measure Triggered*

414 — *Optional:* Device and Network Make Collaborative Decision on the Priority of PSCell Change / Add Via Learning the Energy Consumption Curve / Pattern and Remaining Battery Life

*Re-measure Triggered*

430

Network Device

MOBILE HANDSET

APPLICATIONS ⌐ 906

CLIENT (STORE, DISCOVERY, PLAY) ⌐ 946

FIRMWARE ⌐ 908

TRIGGER COMPONENT ⌐ 938

VIDEO COMP ⌐ 930

HYSTERESIS COMPONENT ⌐ 936

DISPLAY ⌐ 912

SIP CLIENT ⌐ 940

SUBSCRIBER IDENTITY SYSTEM ⌐ 918 ⌐ 920

CAMERA ⌐ 922

COMMUNICATION COMPONENT ⌐ 910

CELL TCVR ⌐ 911    WIFI TCVR ⌐ 913

PROCESSOR ⌐ 902

SERIAL I/O INTERFACE ⌐ 914

MEMORY

LOCATION COMPONENT ⌐ 932

904 ⌐

USER INPUT ⌐ 935

AUDIO I/O ⌐ 916

POWER SOURCE ⌐ 924

POWER I/O ⌐ 926

NON-STANDALONE PRIMARY SECONDARY CELL SELECTION BASED ON HIGHER PRIORITY BAND

TECHNICAL FIELD

The subject application relates to mobile communications devices in general, and more particularly to the selection of frequency bands for mobile device communications, and related embodiments.

BACKGROUND

When new radio (NR. e.g., fifth generation, or 5G) user equipment (a mobile device) measures and reports the signal strength of NR frequency bands, there is no particular reporting priority specified by 3GPP (Third Generation Partnership Project) standards. This results in the 5G base station (gNodeB, or gNB) receiving the measurement reports in an unspecified order, for example, whereby the network's selection of a primary secondary cell (PSCell) is basically the first NR frequency band reported.

Some network vendors have implemented a wait period/timer so as to add a highest order frequency band as a non-standalone primary cell (NSA primary cell) based on expiration of the wait timer. However, this added wait time increases the latency in a new radio communication system.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 is a flow diagram representing example operations for selecting a PSCell for a mobile device based on different time-to-trigger (TTT) time periods for returning new radio (NR) band measurement reports, in accordance with various aspects and embodiments of the subject disclosure.

DETAILED DESCRIPTION

Figure 1:
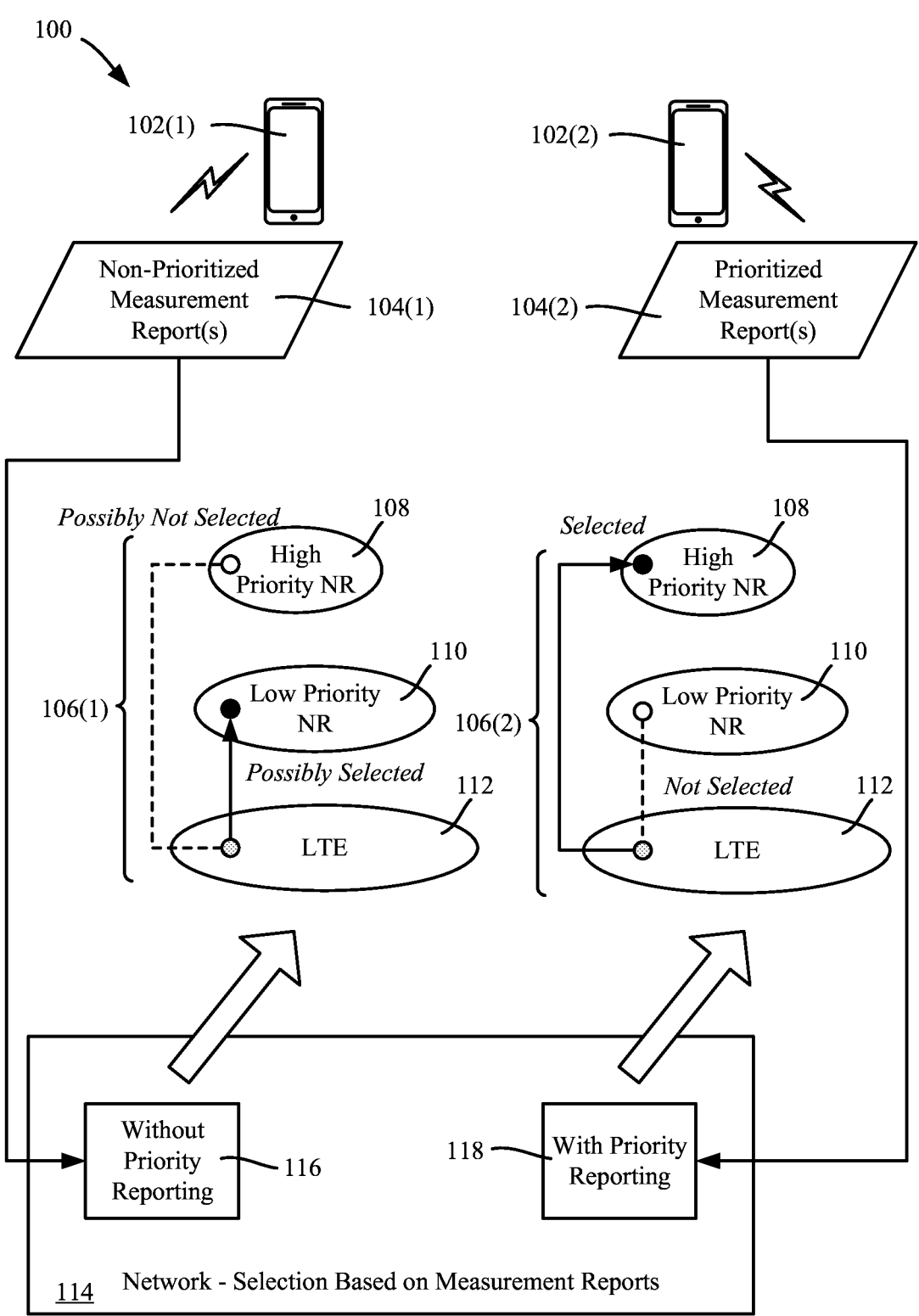
FIG. 1 is a block diagram of an example system in which a network selects primary secondary cells (PSCells) for mobile devices based on measurement reports from the mobile devices, in accordance with various aspects and embodiments of the subject disclosure.

The technology described herein is generally directed towards prioritizing frequency band selection based on prioritized measurement reporting. Either the network or the user equipment (UE) or both can search for high priority cells (e.g., among available candidate collocated cells having different NR frequency bands) and operate to add a highest priority cell of those available. As will be understood, among other benefits, the technology described herein can facilitate selection and utilization of a high capacity (wide bandwidth) cell or other prioritized cell, while not adding additional latency.

To this end, a priority ranking of candidate frequencies is introduced and used when choosing a primary secondary cell (PSCell) in a non-standalone (NSA) environment, during initial setup and/or to change the PSCell. To this end, the UE measures new radio (NR) frequencies, which can be in a specified (prioritized order) and send the measurement reports to the network node (e.g., 5G gNB) in a way that priority is determinable by or specified by the network. For example, to get a good utilization of a higher priority frequency band (such as corresponding to a high capacity "hot spot" cell), the technology described herein searches for these high priority cells, including when the current PSCell radio conditions correspond to sufficient quality. Note that in general a PSCell add/remove/change is normally triggered when a current PSCell encounters better or poorer coverage.

As described herein, a priority ranking and reporting technology operates to consider criteria such as, but not limited to, higher bandwidth frequencies, the balance of NR frequency band priority order, radio conditions, whether an available NR band is being used for dynamic spectrum sharing, on-device real-time application programs, on-device real-time conditions (e.g., battery state or thermal-related issues) and so on. The priority order can be dynamically adjusted, e.g., via reinforcement learning or the like.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a general communications system 100 in which user equipment sends measurement reports to a network node. In the example of FIG. 1, two mobile devices 102(1) and 102(2) (also referred to as user equipment/user equipment devices or UEs) are depicted, in which the mobile device 102(1) sends a non-prioritized measurement report 104(1) and the mobile device 102(2) sends a non-prioritized measurement report 104(2) to the network node. For purposes of this example, consider that both mobile devices are experiencing (and therefore report) similar radio conditions with respect to the available high priority new radio cell 108 and the available low priority new radio cell 110. Note that the long term evolution (LTE) cell 112, the low priority NR cell 110 and the available high priority NR cell 108 are depicted twice each in FIG. 1, and are the same cells in this example, but are shown in "different" cell groups 106(1) and 106(2) to emphasize priority-based selection versus non-priority-based selection as described herein.

Continuing with the example, consider that the mobile device 102(1) is unable to send (e.g., is not configured with the capability) to use priority-based reporting, and thus the non-prioritized measurement report 104(1) is received by the network (block 114) for selection, based on there not being any priority reporting (block 116). Thus, it is possible that the lower priority cell will be selected, as for example, because the measurement report for the lower priority NR cell 110 is received at the network 114 before the measurement report for the higher priority NR cell 108. In this example, the network 114 selects the low priority NR cell 110 for use as the PSCell by the network, even though the high priority NR cell 108 was available. This is depicted in FIG. 1 by the arrow between the LTE cell 112 and the (darkened dot within) the low priority NR cell 110.

In contrast, the mobile device 102(2) is able to send (e.g., is configured with the capability) to use priority-based reporting, and thus the prioritized measurement report 104(2) is received by the network (block 114) for selection, based on the priority reporting (block 118). Note that this can be via multiple, separate reports as described herein. Thus, the higher priority cell 108 will be selected by the network 114 for use as the PSCell by the network. This is depicted in FIG. 1 by the arrow between the LTE cell 112 and the (darkened dot within) the high priority NR cell 108.

5

Figure 2:
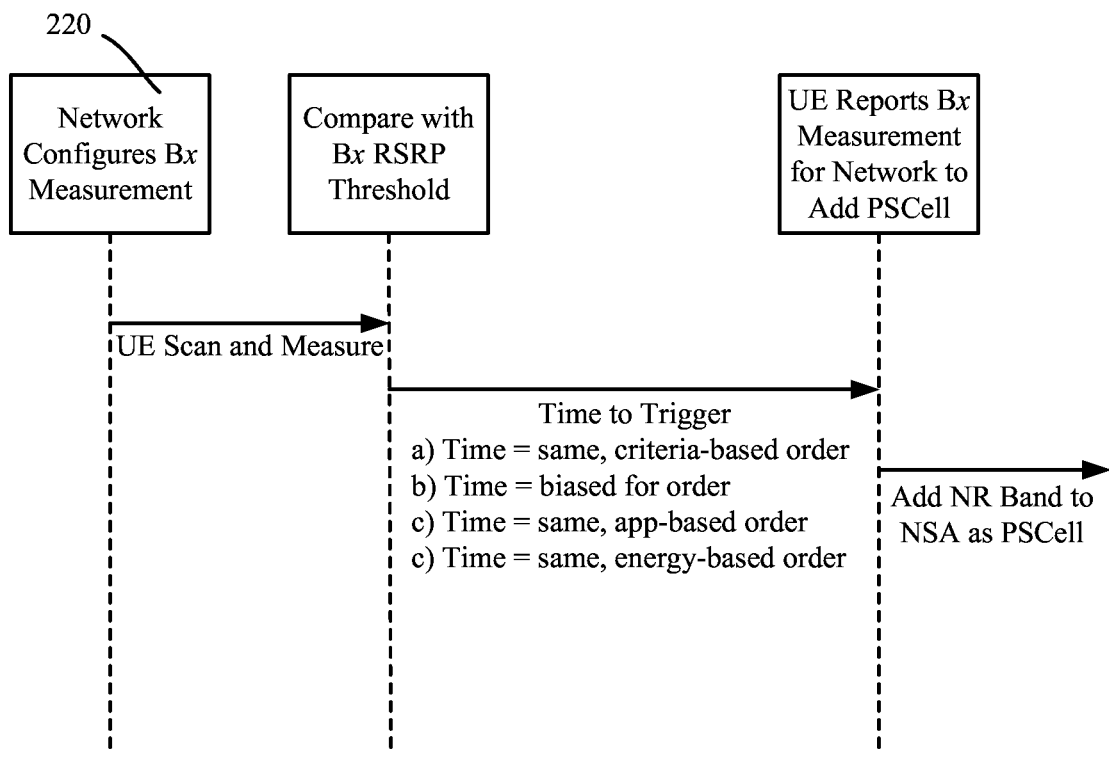
FIG. 2 is a sequence diagram showing example operations/dataflow among various system components to select a PSCell for a mobile device, in accordance with various aspects and embodiments of the subject disclosure.

There are a number of options available as to how prioritization is used. As shown in FIG. 2, consider that a UE is configured by the network (block 220) to obtain a measurement and return a measurement report for a frequency band Bx. A report need not be returned if the measured RSRP (reference signal received power) is below an RSRP threshold as evaluated at block 222.

In this example, the RSRP threshold is met, and thus the measurement report is returned (block 224) based on a time-to-trigger (TTT) period. Based on the report, in the example of FIG. 2, the network operates to select the measured/reported NR band as the PSCell for the UE.

Within FIG. 2 below the "time-to-trigger" arrow, there are a number of options, (which as described herein are not necessarily mutually exclusive but rather can be combined in some way). These options include, but are not limited to, a) sending the measurement report data in the same time-to-trigger period but with criteria-based priority information, b) sending the measurement report data in different time-to-trigger periods that bias the selection, c) sending the measurement report data in the same time-to-trigger period but with priority information based on device application program(s) in use, or d) sending the measurement report data in the same time-to-trigger period but with priority information based on device stat, such as remaining battery capacity and/or device heating considerations.

Figure 3:
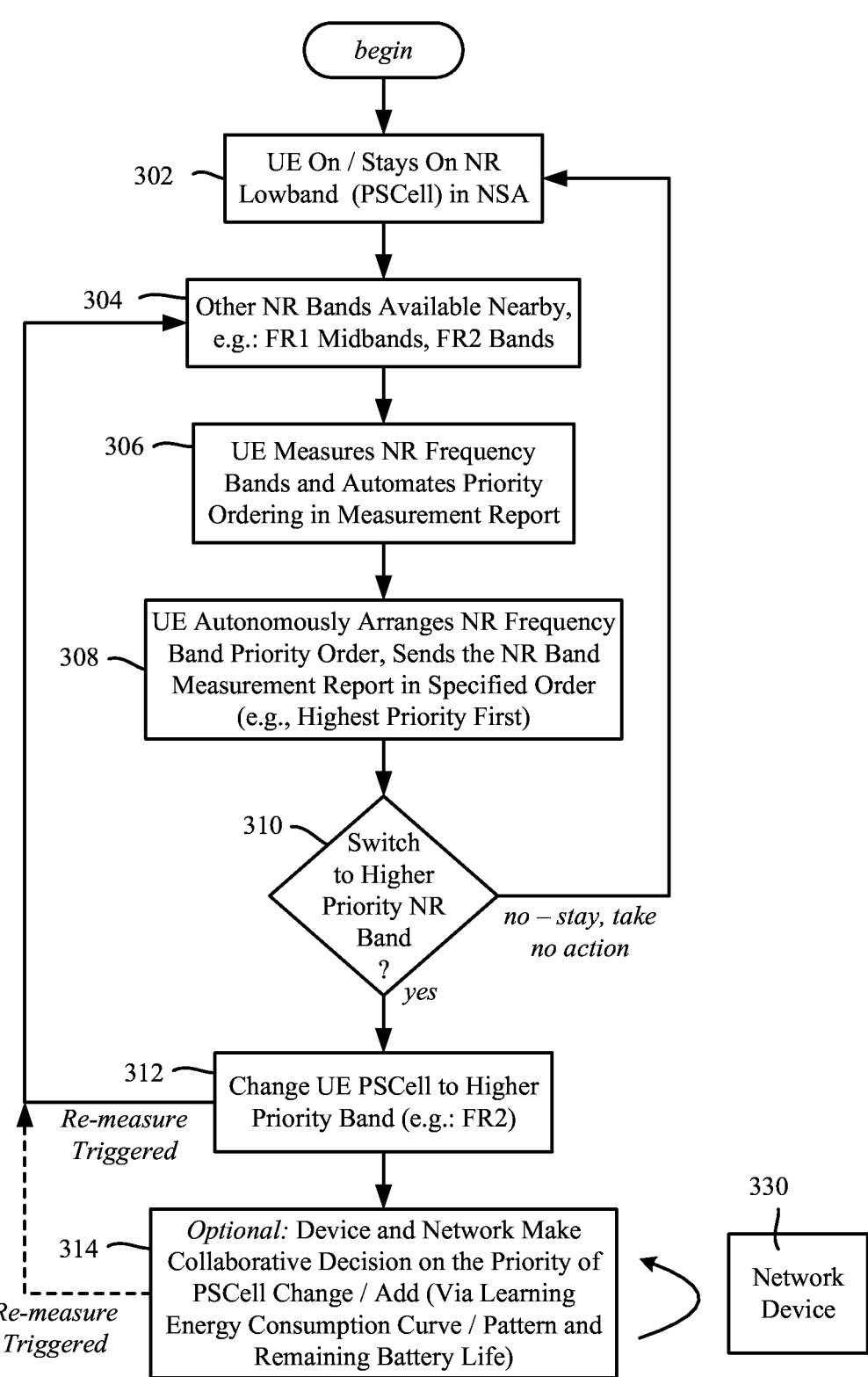
FIG. 3 is a flow diagram representing example operations for selecting a PSCell for a mobile device based on a specified order for returning new radio (NR) band measurement reports, in accordance with various aspects and embodiments of the subject disclosure.

FIG. 3 is flow diagram of example operations in which the UE measures NR frequency bands and automates the priority ordering in the measurement report according to one or more criteria. For one example, the UE can send measurement report with the cells prioritized in specified order. Chipset/device manufacturers can configure devices to report (e.g., aided by artificial intelligence or the like) an autonomous ordering of frequency bands based on measured radio conditions, channel bandwidth, on-device active applications, and so forth.

Note that it is basically identical to send measurement reports with various priority values that the network recognizes, e.g., {CellA, priority=3 (lowest), measurement report data}, {CellB, priority=1 (highest), measurement report data}, {CellC, priority=2, measurement report data} and so on. The network can choose to override this ordering for various reasons, such as if CellB is has a great deal of load and CellC does not.

In the example of FIG. 3, operation/block 302 represents the UE being on a new radio (NR) lowband cell for the NSA PSCell. Operation/block 304 indicates that there are other NR bands available, e.g., FR1 midband cell(s), and cell(s) for FR2 band(s). In general, the UE, based on an event or periodic trigger, performs a measurement action to obtain a measurement report and return the measurement report to the network, generally represented by operation/block 306. Unlike conventional reporting, however, operations/blocks 306 and 308 represent priority-based ordering as described herein. In this example, after arranging by priority, the UE sends the network the measurement report in a priority-specified order, which in this example puts the highest priority cell first. As set forth herein, this can also be accomplished via priority values for each measured available cell.

Operating 310 represents the network determining whether to switch to a higher priority NR band based on the measurement report data, including the priority. This can be the first set of measurement report data obtained by the network, with the understanding that this cell is what the UE has prioritized.

The network can choose to have the UE stay on the existing PSCell, represented in FIG. 3 by returning to operation/block 302, at least until a next re-measure operation is triggered. Instead, if at operation 310 the network agrees to select a higher priority band for a new PSCell for the UE, operation 312 is performed to make the change.

Operation 314 represents an optional operation in which the device and network (network device 430) can collaborate to make a decision on which to change the PSCell based on other data. For example, a device's energy consumption and battery life can be learned over time, and this information used to select a PSCell that uses less power so that the device does not run out of battery or overheat. Current device (and network) conditions can be considered during the collaboration, such as not to switch to a different PSCell to save power (at least for a while) because battery capacity is not currently an issue.

Note that FIG. 3 (as well as FIGS. 4 and 5) illustrates the inter-frequency PSCell changing to higher priority NR band when already on a lesser priority NR band PSCell. However, although not explicitly shown, it should be understood these operations and the like can be extended to PSCell cell selection during initial NSA setup to select the higher priority NR band.

The priority ranking can be based on any of various criteria. For example, bandwidth can be the (e.g., sole) criterion, such that a candidate PSCell with the widest bandwidth (Band A=100 megahertz available spectrum) can be prioritized over a candidate PSCell with less bandwidth (Band B=10 megahertz available spectrum). Another criterion can be whether a frequency band is clean, dedicated NR spectrum versus dynamic spectrum sharing. These two criteria can be combined, e.g., if Band A's available spectrum is larger than but reasonably close to (e.g., within some threshold) Band B's available spectrum, select Band B if Band A is being used for dynamic spectrum sharing. Yet another criterion can be loading of a frequency band; e.g., if Band A is highly loaded and Band B is not highly loaded, the network can select Band B as the PSCell frequency band even if the UE has prioritized Band A over Band B in its reporting. Note that it is feasible for the network to inform the UE as to the current loading conditions prior to measuring and reporting the measurement data, so that the UE can factor in the loading when prioritizing the candidate frequency bands.

FIG. 4 is flow diagram of example operations in which the UE measures NR frequency bands and automates the priority ordering according to different TTT periods indicated by the network. To this end, the UE and network arrange for relatively "early" B1 measurement and reporting for a high priority band within the TTT period, and so on. This is in contrast to current implementations in which the network and UE follow a static TTT.

In the example of FIG. 4, operation/block 402 represents the UE being on a new radio (NR) lowband cell for the NSA PSCell. Operation/block 404 indicates that there are other NR bands available, e.g., FR1 midband cell(s), and cell(s) for FR2 band(s). In general, the UE, based on an event or periodic trigger, performs a measurement action to obtain a measurement report and return the measurement report to the network, generally represented by operation/block 406.

Unlike conventional reporting, however, operation/block 408 represents priority-based ordering as described herein based on different time-to-trigger (TTT) time periods. In this example, the network has indicated a preference for a certain ordering, and thus biases the order of reporting respective measurements reports for the different respective available candidate PSCells. For one example, a UE can be configured by its chipset/device manufacturer to measure and report according to different TTT times specified by the network, that is, vendors can develop proprietary solutions to adjust the TTT length per frequency band. The early B1 measurement report (when to send) can be dynamically adjusted through reinforcement learning. For example, consider that the network wants to switch the UE, if possible, to a different PSCell, and then if not that one then another PSCell, and so on. For example, the network may want to switch the UE to a less loaded PSCell, even if that is not the highest (or even higher) bandwidth candidate PSCell available.

Thus, the network can instruct the UE to use a first TTT period for candidate PSCellA of 2.0 milliseconds, a second TTT period for candidate PSCellB of 1.0 millisecond, a third TTT period for candidate PSCellB of 5.0 milliseconds, and so on. Two or more of the TTT periods can be the same, such as if the network does not care which one ultimately is selected among those two or more cells, in the event that measurement report data is received for each (or at least received for more than one with the same TTT period).

As a result, the measurement report data is received at different times, and the first candidate PSCell (ordinarily) measured and returned corresponds to the one with the lowest TTT period. Note that a UE need not return a measurement report for a cell, such as if the RSRP threshold is not met by the measured RSRP.

Operating 410 represents the network determining whether to switch to a higher priority NR band based on the measurement report data, including the priority. This can be the first set of measurement report data obtained by the network, with the understanding that this cell is what the UE has prioritized.

The network can choose to have the UE stay on the existing PSCell, represented in FIG. 4 by returning to operation/block 402, at least until a next re-measure operation is triggered. Instead, if at operation 410 the network agrees to select a higher priority band for a new PSCell for the UE, operation 412 is performed to make the change.

As with operation 314 of FIG. 3, operation 414 represents an optional operation in which the device and network (network device 430) can collaborate to make a decision on which to change the PSCell based on other data. For example, selection of a PSCell that uses less power can thus occur as appropriate.

Figure 5:
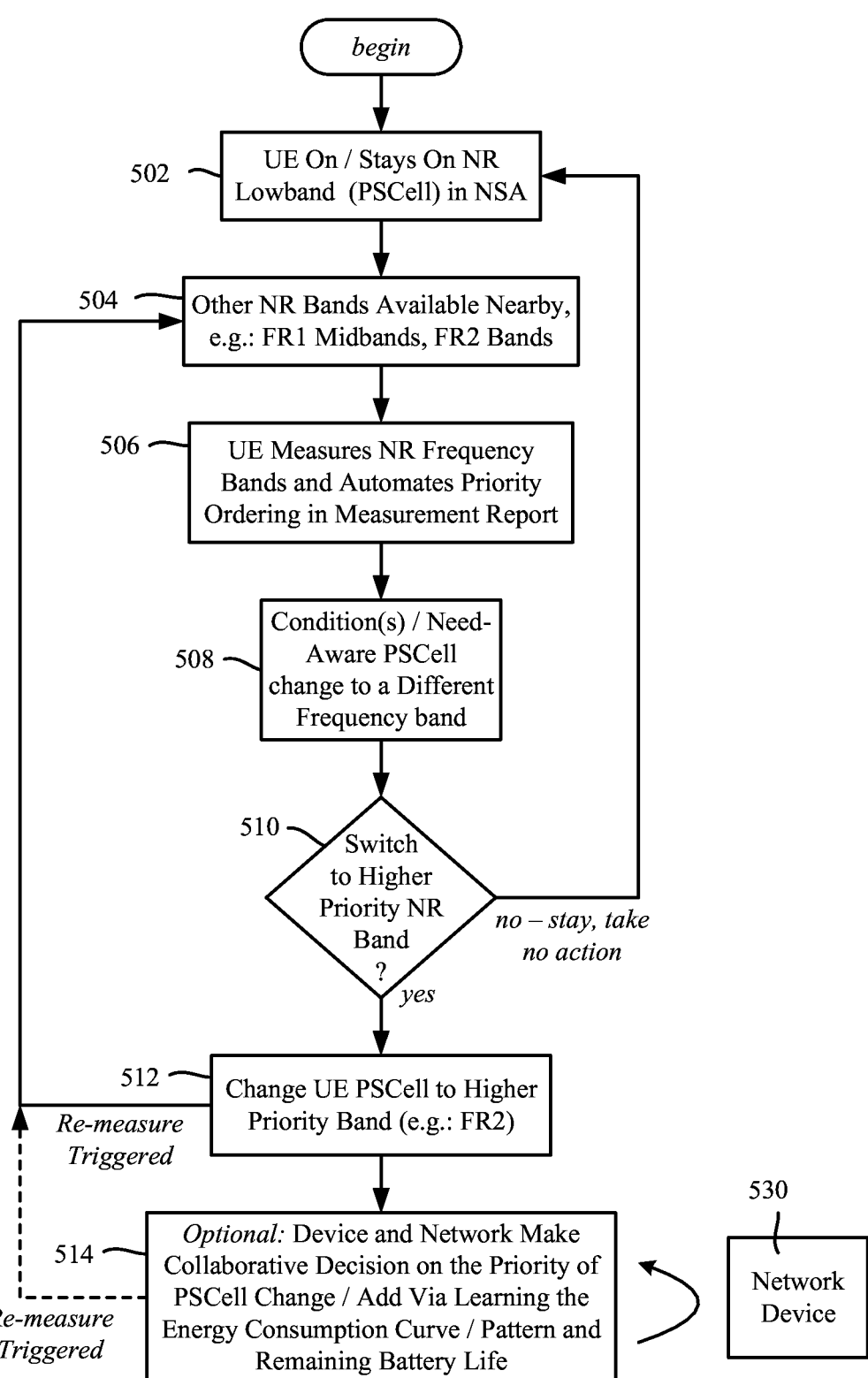
FIG. 5 is a flow diagram representing example operations for selecting a PSCell for a mobile device based on different mobile device conditions, in accordance with various aspects and embodiments of the subject disclosure.

FIG. 5 is flow diagram of example operations in which the UE measures NR frequency bands and automates the priority ordering in the measurement report according to one or more device conditions. In the example of FIG. 5, operation/block 502 represents the UE being on a new radio (NR) lowband cell for the NSA PSCell. Operation/block 504 indicates that there are other NR bands available, e.g., FR1 midband cell(s), and cell(s) for FR2 band(s). In general, the UE, based on an event or periodic trigger, performs a measurement action to obtain a measurement report and return the measurement report to the network, generally represented by operation/block 506.

Unlike conventional reporting, however, operation/block 508 represents priority-based ordering as described herein based on device condition data, e.g., a device's need-aware PSCell change to a different frequency band. Such a change can be made to occur instead of being adjusted following events such as A5 (the serving cell becomes worse than threshold-1 while a neighboring cell becomes better than threshold-2), A3 (a neighboring cell becomes better than the serving cell by an offset.), or others. Vendors can develop proprietary solution to dynamically adjust the NR frequency band priority order in NR measurement report following the needs of real-time applications on device.

By way of example, consider an intelligent utilization of different frequency bands based on a devices state and an application program's need. For example, an FR2 band can be selected for ultra-wideband needs in a slow mobility, static scenario, such as a user sitting at a desk watching a 4K video. FR1 lowband, which can provide excellent penetration and coverage but narrower bandwidth, can be used for other device needs, such as a user working on an email application or text messaging. FR1 high band can be selected when there is a need for good balance between coverage and capacity.

As a result, the measurement report data can be ordered by the UE so as to be received at different times (as in FIG. 3), or arranged with an associated priority value. If the alternative of FIG. 4 is in use, the UE can simply omit reporting on the cell or cells that are not appropriate, whereby the network will (ordinarily, unless needing to override for other reasons such as heavy loading) switch the PSCell based on the reported cell that the UE deems more appropriate. It is also feasible for a network to be informed of (or deduce) the needs of a user device and thus select (or bias selection via different TTT periods) so that a PSCell is appropriately selected for a mobile device based on current needs.

Operating 510 represents the network determining whether to switch to a higher priority NR band based on the measurement report data, including the prioritization data. This can be the first set of measurement report data obtained by the network, with the understanding that this cell is what the UE has prioritized (possibly biased by the network).

The network can choose to have the UE stay on the existing PSCell, represented in FIG. 5 by returning to operation/block 502, at least until a next re-measure operation is triggered. Instead, if at operation 510 the network agrees to select a higher priority band for a new PSCell for the UE, operation 512 is performed to make the change.

As with operation 314 of FIG. 3, operation 514 represents an optional operation in which the device and network (network device 530) can collaborate to make a decision on which to change the PSCell based on other data. For example, selection of a PSCell that uses less power can thus occur as appropriate.

As set forth herein, another device condition is the UE energy consumption, as higher priority (wider bandwidth) frequencies have been found to tend to increase a UE's energy consumption. Energy consumption data can be evaluated with respect to battery life, such as if the battery is low, and/or potential overheating of a device is possible; (the current temperature can be considered, as well as learned data). Thus, as represented in FIGS. 3, 4 and 5 via blocks 314, 414 and 514, respectively, a PSCell change/addition can periodically (or otherwise, such as on demand) perform coverage detection of higher priority frequencies. The device and network can make a collaborative decision on the priority of a PSCell change/addition via learning the energy consumption curve/pattern and remaining battery life for a device, as well as learning from a group of similar devices. Historical data learned from possibly millions of devices can be used in the learning process. For example, a UE can inform the network that it has less than twenty percent remaining battery capacity, whereby the network can put the UE in a below a twenty percent category with respect to selecting a PSCell (as learned).

It should be noted that any of these alternatives in FIGS. 3-5 can operate independently or collectively. For example, consider that the different TTT period alternative is available, but the network does not (possibly by choice) specify any different times. In such a situation, the UE can prioritize as in the example of FIG. 3. Whether the alternatives of FIGS. 3 and 4 or a combination of both are in use, a UE can choose not to report on a candidate cell, such as to influence selection based on need as in FIG. 5, whereby the network will not ordinarily choose that cell. PSCell selection based on energy consumption alternative(s) described with reference to blocks 314, 414 and 514 of FIGS. 3, 4 and 5, respectively, have previously been described herein with respect to each of the possible alternatives in any or all of FIGS. 3-5.

Figure 6:
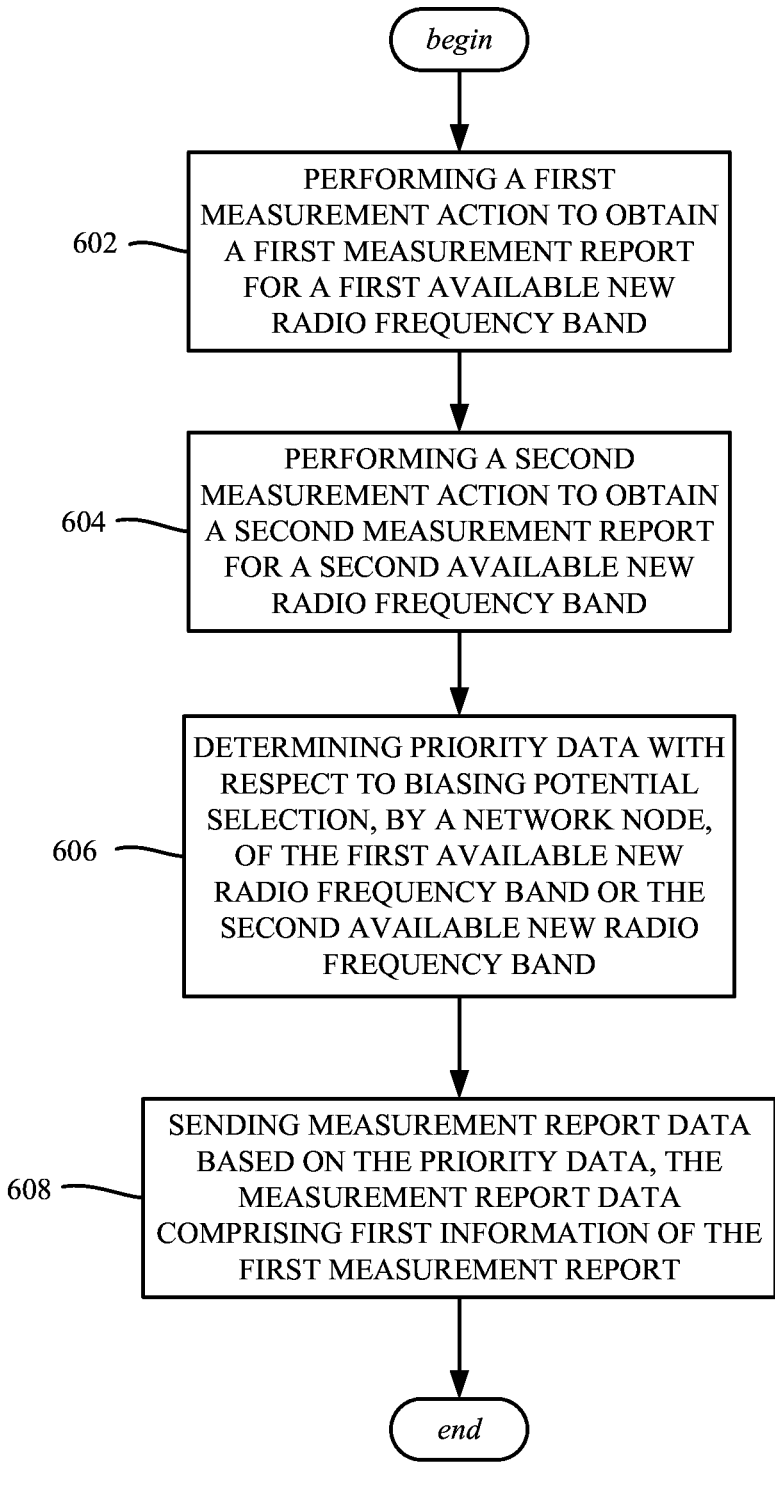
FIG. 6 is a flow diagram representing example operations related to a mobile device sending measurement reports based on priority data, in accordance with various aspects and embodiments of the subject disclosure.

One or more example aspects are represented in FIG. 6, and can correspond to a system, including a processor, and a memory that stores executable instructions and/or components that, when executed by the processor, facilitate performance of operations. Example operation 602 represents performing a first measurement action to obtain a first measurement report for a first available new radio frequency band. Example operation 604 represents performing a second measurement action to obtain a second measurement report for a second available new radio frequency band. Example operation 606 represents determining priority data with respect to biasing potential selection, by a network node, of the first available new radio frequency band or the second available new radio frequency band. Example operation 608 represents sending measurement report data based on the priority data, the measurement report data comprising first information of the first measurement report.

The measurement report data further can include second information of the second measurement report, and sending the measurement report data can include sending the first information before sending the second information.

The measurement report data further can include second information of the second measurement report, sending the measurement report data can include sending the first information in association with a first priority level and sending the second information in association with a second priority level, in which the first priority level is different from the second priority level.

The measurement report data can omit second information of the second measurement report.

The priority data can include a first time-to-trigger value for the first available new radio frequency band, and a second time-to-trigger value for the second available new radio frequency band.

Determining the priority data with respect to the biasing of the potential selection can include determining a higher priority level for the first available new radio frequency band based on a higher bandwidth of the first available new radio frequency band relative to a lower bandwidth of the second available new radio frequency band.

Determining the priority data with respect to the biasing of the potential selection can include determining a lower priority level for the second available new radio frequency band, relative to a higher priority level for the first available new radio frequency band, based on the second available new radio frequency band being used as a dynamic spectrum-sharing frequency band.

Determining the priority data with respect to the biasing of the potential selection can be based on a current usage scenario of the mobile device. The current usage scenario of the mobile device can include at least one of: an application program running on the mobile device, or a remaining capacity of a battery that is powering the mobile device.

Further operations can include receiving, from a network node, at least part of the priority data based on first network load data associated with the first available new radio frequency band and second network load data associated with the second available new radio frequency band.

Figure 7:
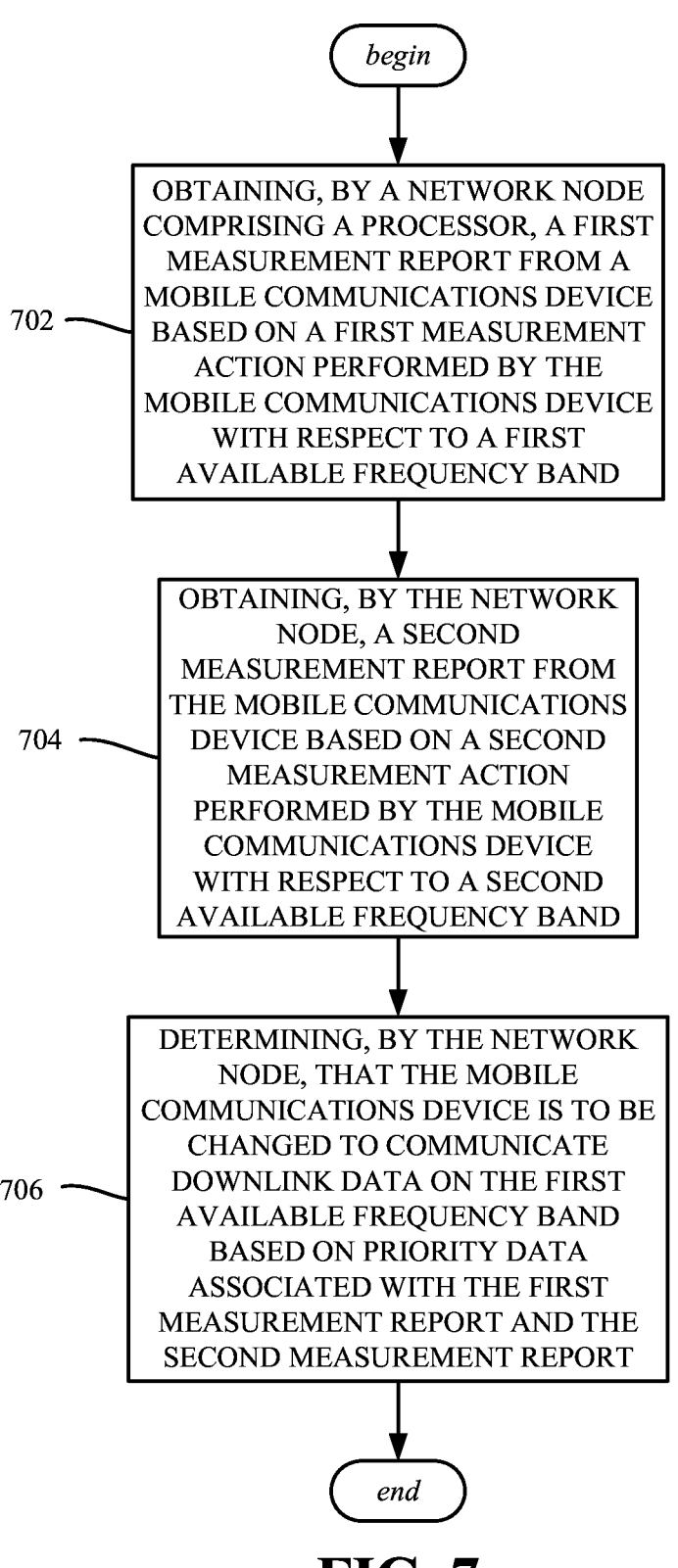
FIG. 7 is a flow diagram representing example operations related to a network node determining from measurement reports to change a mobile device to communicate on a priority-based available frequency band, in accordance with various aspects and embodiments of the subject disclosure.

One or more example aspects are represented in FIG. 7, and, for example, can correspond to operations, such as of a method. Example operation 702 represents obtaining, by a network node comprising a processor, a first measurement report from a mobile communications device based on a first measurement action performed by the mobile communications device with respect to a first available frequency band. Example operation 704 represents obtaining, by the network node, a second measurement report from the mobile communications device based on a second measurement action performed by the mobile communications device with respect to a second available frequency band. Example operation 706 represents determining, by the network node, that the mobile communications device is to be changed to communicate downlink data on the first available frequency band based on priority data associated with the first measurement report and the second measurement report.

The priority data can be inferred by the network node based on an order of receiving the first measurement report relative to receiving the second measurement report.

Further operations can include sending, by the network node, information to the mobile communications device, to attempt to bias the order in which the network node is to receive the first measurement report relative to the second measurement report.

Sending the information can include sending a first time-to-trigger value for the first available frequency band, and a second time-to-trigger value for the second available frequency band.

Sending the information can include sending first load data for the first available frequency band, and second load data for the second available frequency band.

Figure 8:
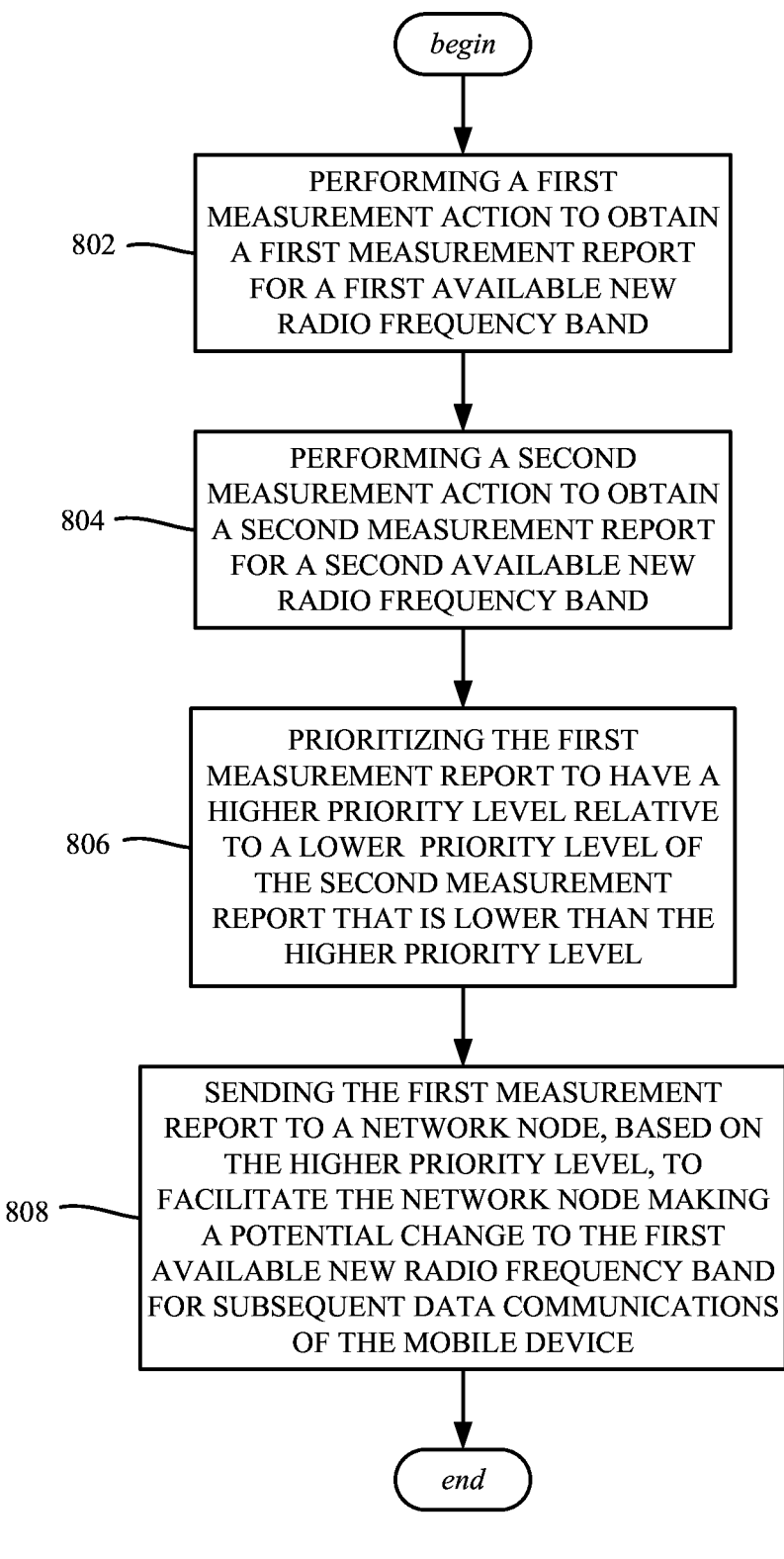
FIG. 8 is a is a flow diagram representing example operations related to a mobile device performing measurements to obtain measurement reports based on priority data, in accordance with various aspects and embodiments of the subject disclosure.

One or more aspects are represented in FIG. 8 such as implemented in a machine-readable medium, including executable instructions that, when executed by a processor of a mobile device, facilitate performance of operations. Example operation 802 represents performing a first measurement action to obtain a first measurement report for a first available new radio frequency band. Example operation 804 represents performing a second measurement action to obtain a second measurement report for a second available new radio frequency band. Example operation 806 represents prioritizing the first measurement report to have a higher priority level relative to a lower priority level of the second measurement report that is lower than the higher priority level. Example operation 808 represents sending the first measurement report to a network node, based on the higher priority level, to facilitate the network node making a potential change to the first available new radio frequency band for subsequent data communications of the mobile device.

Prioritizing the first measurement report to have the higher priority level relative to the lower priority level of the second measurement report can include coordinating sending the first measurement report to the network node, without delaying for a wait period, prior to sending the second measurement report.

Prioritizing the first measurement report to have the higher priority level relative to the lower priority level of the second measurement report can be based on at least one of: determining that the first available new radio frequency band has a higher bandwidth relative to a lower bandwidth of the second available new radio frequency band, or determining that the second available new radio frequency band is able to be used for dynamic spectrum sharing.

Prioritizing the first measurement report to have the higher priority level relative to the lower priority level of the second measurement report can be based on download data requested by a program executing on the mobile device.

Prioritizing the first measurement report to have the higher priority level relative to the lower priority level of the second measurement report can be based on a value representative of a remaining battery capacity of the mobile device.

As can be seen, the technology described herein facilitates reduced latency for a non-standalone (NSA) setup and/or change via based on specified or prioritized of NR measurement reports. The technology described herein facilitates more optimal utilization of the network, including by on-demand selecting of the PSCell in initial NSA setup, as well as on-demand changing of the PSCell in an NSA connection to a different band. Device conditions such as current device application-based data needs, and/or higher battery efficiency via reinforcement learning or the like, can be used to adjust the priority of PSCell change based on measuring available NR frequency bands. Higher throughput can be provided by utilizing wider bandwidth cells to a greater extent, which can also offload the loading on NR coverage layers (with limited low frequency bands.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g.

interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
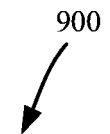
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE-1394) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
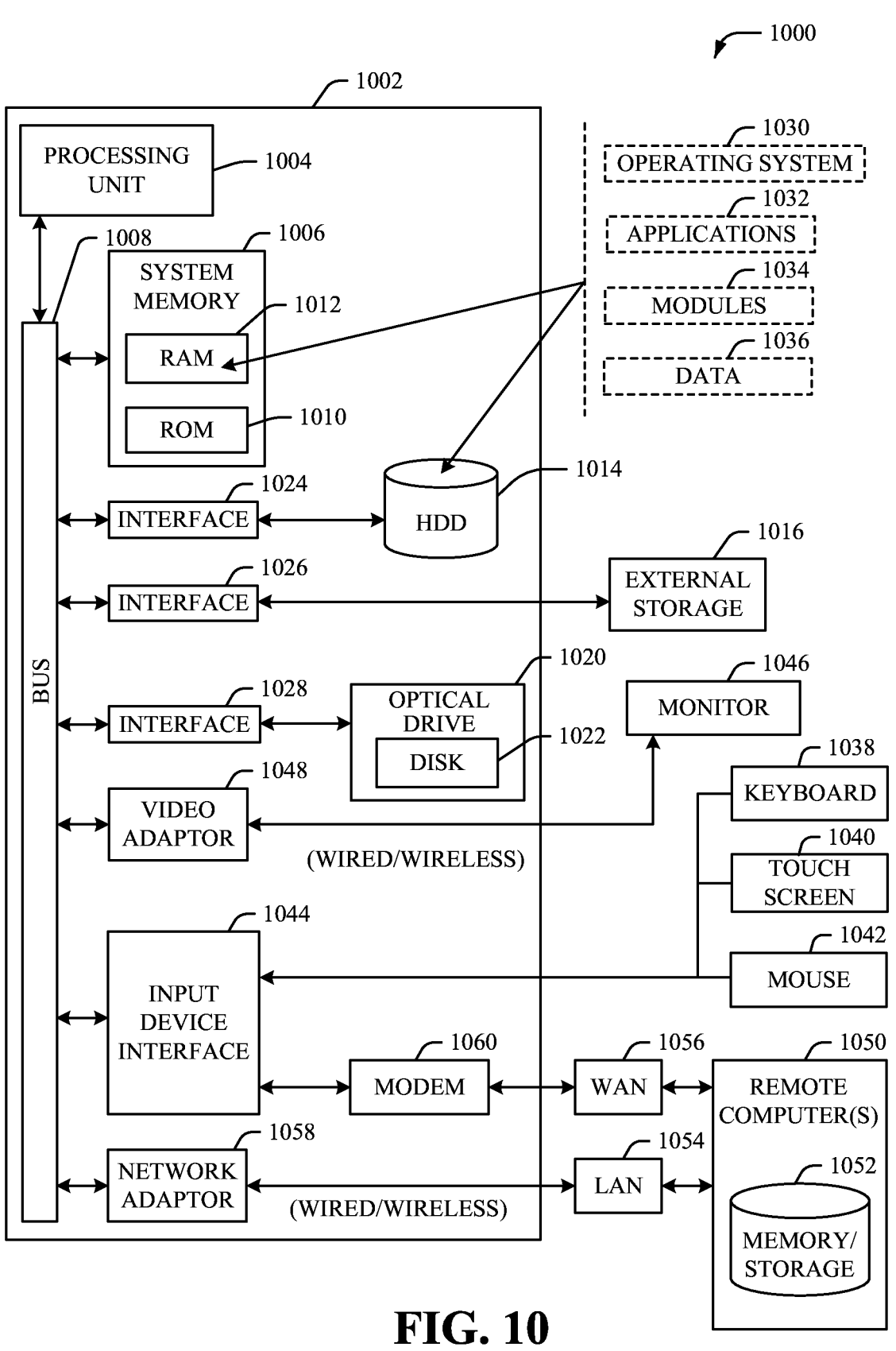
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown).

Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE-1394) interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE-1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A mobile device, comprising:

a processor; and a memory that stores executable instructions that, when executed by the processor of the mobile device, perform operations comprising:

performing a first measurement action to obtain a first measurement report for a first available new radio frequency band;

performing a second measurement action to obtain a second measurement report for a second available new radio frequency band;

determining priority data with respect to biasing potential selection, by a network node, of the first available new radio frequency band or the second available new radio frequency band;

adjusting the priority data based on time-to-trigger (TTT) values that are different for available frequency bands including the first and second available new radio frequency band, wherein the adjusting of the priority data is performed according to reinforcement learning that biases an order of reporting respective measurement reports for available candidate PSCells; and sending measurement report data at a particular time that includes an ordering based on the priority data, wherein the particular time is selected based on the TTT values being different and wherein the measurement report data comprises first information of the first measurement report.

2. The mobile device of claim 1, wherein the measurement report data further comprises second information of the second measurement report, and wherein sending the measurement report data comprises sending the first information before sending the second information.

3. The mobile device of claim 1, wherein the measurement report data further comprises second information of the second measurement report, wherein sending the measurement report data comprises sending the first information in association with a first priority level and sending the second information in association with a second priority level, and wherein the first priority level is different from the second priority level.

4. The mobile device of claim 1, wherein the measurement report data omits second information of the second measurement report.

5. The mobile device of claim 1, wherein the priority data comprises a first time-to-trigger value for the first available new radio frequency band, and a second time-to-trigger value for the second available new radio frequency band, wherein the adjusting of the priority data is performed according to reinforcement learning further based on application-based data needs, battery efficiency, or a combination thereof to adjust the priority data for the available candidate PSCells.

6. The mobile device of claim 1, wherein determining the priority data with respect to the biasing of the potential selection comprises determining a higher priority level for the first available new radio frequency band based on a higher bandwidth of the first available new radio frequency band relative to a lower bandwidth of the second available new radio frequency band.

7. The mobile device of claim 1, wherein determining the priority data with respect to the biasing of the potential selection comprises determining a lower priority level for the second available new radio frequency band, relative to a higher priority level for the first available new radio frequency band, based on the second available new radio frequency band being used as a dynamic spectrum-sharing frequency band.

8. The mobile device of claim 1, wherein determining the priority data with respect to the biasing of the potential selection is based on a current usage scenario of the mobile device.

9. The mobile device of claim 8, wherein the current usage scenario of the mobile device comprises at least one of: an application program running on the mobile device, or a remaining capacity of a battery that is powering the mobile device.

10. The mobile device of claim 1, wherein the operations further comprise receiving, from a network node, at least part of the priority data, wherein the priority data is based on first network load data associated with the first available new radio frequency band and second network load data associated with the second available new radio frequency band.

11. A non-transitory machine-readable medium, comprising executable instructions that, when executed by a processor of a mobile device, perform operations, the operations comprising:

performing a first measurement action to obtain a first measurement report for a first available new radio frequency band;

performing a second measurement action to obtain a second measurement report for a second available new radio frequency band;

adjusting priority data based on time-to-trigger (TTT) values that are different for available frequency bands including the first and second available new radio frequency band, wherein the adjusting of the priority data is performed according to reinforcement learning that biases an order of reporting respective measurement reports for available candidate PSCells;

prioritizing the first measurement report to have a higher priority level based on the TTT values relative to a lower priority level of the second measurement report that is lower than the higher priority level; and sending the first measurement report to a network node that includes an ordering based on the higher priority level, to facilitate the network node making a potential change to the first available new radio frequency band for subsequent data communications of the mobile device.

12. The non-transitory machine-readable medium of claim 11, wherein prioritizing the first measurement report to have the higher priority level relative to the lower priority level of the second measurement report comprises coordinating sending the first measurement report to the network node, without delaying for a wait period, prior to sending the second measurement report.

13. The non-transitory machine-readable medium of claim 11, wherein prioritizing the first measurement report to have the higher priority level relative to the lower priority level of the second measurement report is based on at least one of: determining that the first available new radio frequency band has a higher bandwidth relative to a lower bandwidth of the second available new radio frequency band, or determining that the second available new radio frequency band is able to be used for dynamic spectrum sharing.

14. The non-transitory machine-readable medium of claim 11, wherein prioritizing the first measurement report to have the higher priority level relative to the lower priority level of the second measurement report is based on download data requested by a program executing on the mobile device.

15. The non-transitory machine-readable medium of claim 11, wherein prioritizing the first measurement report to have the higher priority level relative to the lower priority level of the second measurement report is based on a value representative of a remaining battery capacity of the mobile device.

16. A method, comprising:

performing, by a processing system including a processor, a first measurement action to obtain a first measurement report for a first available new radio frequency band;

performing, by the processing system, a second measurement action to obtain a second measurement report for a second available new radio frequency band;

determining, by the processing system, priority data with respect to biasing potential selection, by a network node, of the first available new radio frequency band or the second available new radio frequency band;

adjusting the priority data based on time-to-trigger (TTT) values that are different for available frequency bands including the first and second available new radio frequency band, wherein the adjusting of the priority data is performed according to reinforcement learning that biases an order of reporting respective measurement reports for available candidate PSCells; and sending, by the processing system, measurement report data at a particular time that includes an ordering based on the priority data, wherein the particular time is selected based on the TTT values being different and wherein the measurement report data comprises first information of the first measurement report.

17. The method of claim 16, wherein the measurement report data further comprises second information of the second measurement report, and wherein sending the measurement report data comprises sending, by the processing system, the first information before sending the second information.

18. The method of claim 16, wherein the measurement report data further comprises second information of the second measurement report, wherein sending the measurement report data further comprises sending, by the processing system, the first information in association with a first priority level and sending, by the processing system, the second information in association with a second priority level, and wherein the first priority level is different from the second priority level.

19. The method of claim 16, wherein the measurement report data omits second information of the second measurement report.

20. The method of claim 16, wherein the priority data comprises a first time-to-trigger value for the first available new radio frequency band, and a second time-to-trigger value for the second available new radio frequency band, wherein the adjusting of the priority data is performed according to reinforcement learning further based on application-based data needs, battery efficiency, or a combination thereof to adjust the priority data for the available candidate PSCells.

* * * * *